United States Patent [19]

O'Brien

[11] Patent Number: 5,226,526
[45] Date of Patent: Jul. 13, 1993

[54] DETACHABLE FLIGHTS FOR BULK MATERIAL CONVEYORS

[75] Inventor: Richard E. O'Brien, Aurora, Ill.

[73] Assignee: O'Brien Systems, Sugar Grove, Ill.

[21] Appl. No.: 914,872

[22] Filed: Jul. 16, 1992

[51] Int. Cl.$^5$ .............................................. B65G 19/24
[52] U.S. Cl. ..................................... 198/731; 198/733; 198/716
[58] Field of Search ............... 198/716, 731, 733, 734, 198/803.01, 730

[56] References Cited

U.S. PATENT DOCUMENTS

| | | | |
|---|---|---|---|
| 231,186 | 8/1880 | Neacy | 198/733 |
| 659,348 | 10/1900 | Mercer | 198/731 |
| 1,999,484 | 4/1935 | Sinden | 198/730 |
| 2,154,707 | 4/1939 | Sinden . | |
| 2,155,874 | 4/1939 | Sinden . | |
| 2,160,234 | 5/1939 | Sinden . | |
| 2,290,077 | 7/1942 | Sinden | 198/731 |
| 2,389,279 | 11/1945 | Sinden | 198/731 |
| 2,433,324 | 12/1947 | Rogers | 198/733 |
| 3,687,272 | 8/1972 | Eisenegger | 198/716 |
| 4,426,185 | 1/1984 | Wheeler . | |
| 4,466,532 | 8/1984 | Minneman et al. . | |
| 4,585,116 | 4/1986 | Albrecht | 198/734 |

FOREIGN PATENT DOCUMENTS 421844 1/1935 United Kingdom .
421986 1/1935 United Kingdom .

OTHER PUBLICATIONS

Catalog 6010, dated Oct. 1986 of Stephens-Adamson Corporation, pp. 2-6, 24 and 25.

*Primary Examiner*—Joseph E. Valenza
*Attorney, Agent, or Firm*—Leydig, Voit & Mayer

[57] ABSTRACT

An elongated drawbar tension element is provided for the conveyor chain of an en masse conveyor. The drawbar includes a hollow hub at one end for receiving an enlargement at the other end of an adjacent drawbar element coupled thereto to form a chain. The side faces of the hollow drawbar hub are formed with tapered dovetail shaped grooves for receiving complementary tapered dovetail shaped tongues formed on the inboard sides of transversely extending conveyor flights. The tapered tongue and groove connection is self-tightening in normal use and the complementary dovetail configuration thereof prevents lateral separation of the conveyor flights from the drawbar hub. An adhesive material may be applied to the self-tightening connection to prevent loosening thereof and separation of the flights from the drawbar elements when the conveyor chain is subjected to vibration, irregular loads or is moving in a downward direction.

18 Claims, 5 Drawing Sheets

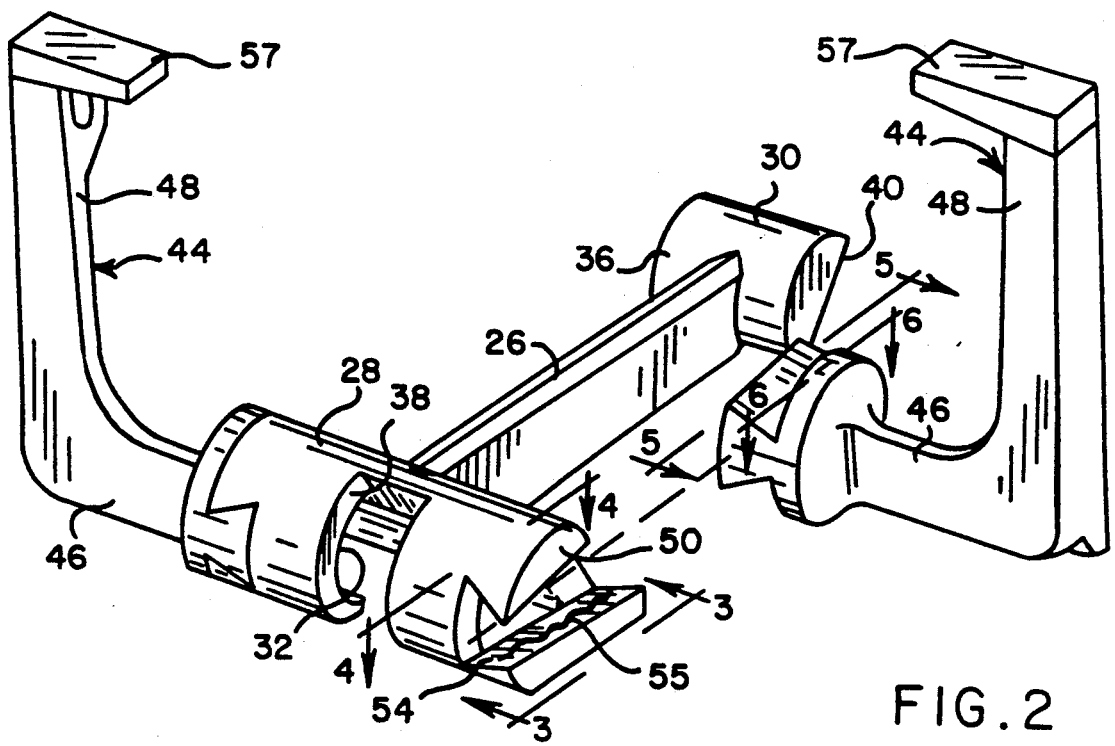
FIG.2
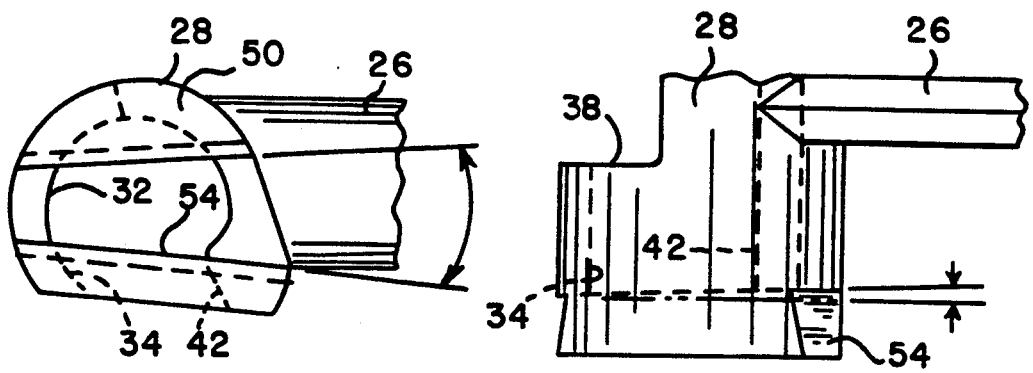
FIG.3
FIG.4
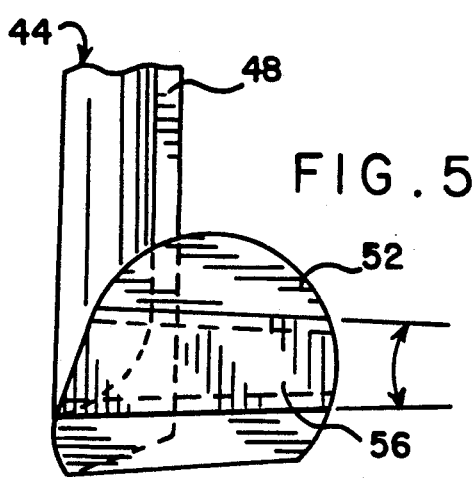
FIG.5
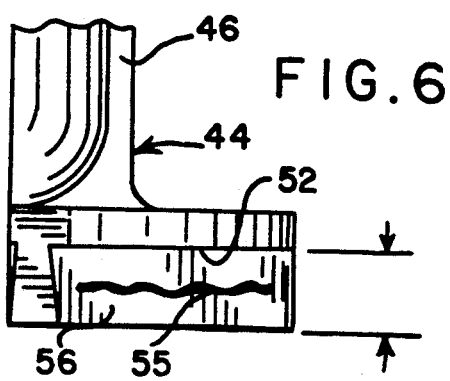
FIG.6

DETACHABLE FLIGHTS FOR BULK MATERIAL CONVEYORS

FIELD OF THE INVENTION

The present invention relates generally to bulk material conveyors or elevators and more particularly concerns replaceable flights which are detachably secured to the drawbar links of the conveyor chain by means of self-tightening connections.

BACKGROUND OF THE INVENTION

It is often necessary to move bulk materials such as sand, gravel, mineral ore, grain, flour, sawdust, dry chemicals and other granular or pelletized material from one place to another along a horizontal, an inclined or a generally vertical path. One way to move such bulk materials is with what are now commonly called "en masse" conveyors. Such conveyors typically have an elongated housing, essentially square or rectangular in cross-section, through which an endless conveyor chain is pulled by a suitable power driven sprocket wheel, usually located adjacent the discharge end of the conveyor.

Located below a loose pile, a storage bin or some other supply device of the bulk material, the conveyor housing includes a supply or inlet opening through which the bulk material flows so as to completely fill the interior, material-conveying, cross-section of the housing. At a point where the bulk material is to be delivered, the conveyor housing is provided with an outlet opening through which the bulk material exits into a discharge pile, another storage bin, or into the hopper or tank of a transportation vehicle such as a truck trailer, rail car or ship's hold.

The conveyor chain is typically made up of a plurality of longitudinally extending links connected to one another by articulated joints and a plurality of generally transversely extending paddles or flights which engage and convey the bulk material along inside the conveyor housing. Because the bulk material fills substantially the entire internal, material-conveying, cross-section of the conveyor housing from the inlet opening to the outlet opening, the material is moved by and with the conveyor chain essentially as a moving column of material with very little shear or slippage between the conveyor chain and the bulk material. This form of movement, of course, is what gives rise to the name "en masse" conveyor or elevator.

Conveyors of the foregoing type are also sometimes referred to as "Redler Conveyors" after the name of the original inventor. U.S. Pat. Nos. 1,999,484 and 2,290,077 issued to Alfred De Los Sinden and assigned to the Redler Conveyor Company are illustrative of the general configuration of such conveyors. The earlier one of these patents shows the conveyor flights formed integrally with the tension or drawbar elements of the conveyor chain. Conveyors of this type are still being sold commercially, but they require complete replacement of the integral chain link and flight if the original flight is damaged or if a different flight configuration is desired. This requires disassembly of the conveyor chain and is both time consuming and expensive. The latter Sinden patent discloses bolt on conveyor flights but these have met with only limited success due to the difficulty often encountered in gaining access to the connecting bolts and removing them, particularly after the bolt threads become frozen in their sockets due to rust, corrosion or other foreign material.

OBJECTS AND SUMMARY OF THE INVENTION

It is the primary aim of the present invention to provide a conveyor link for an en masse conveyor including a drawbar element and a readily replaceable conveyor flight which is detachably secured thereto by a connection that is self-tightening in normal use. Another object is to provide a drawbar element with such a connection whereby conveyor flights of different sizes, shapes and materials may be readily installed on the drawbar element in order to adapt the conveyor to handle different materials or conditions.

According to the present invention the detachable connection between the drawbar element and the conveyor flights includes complementary tapered tongue and groove means on the face of the drawbar hub and the inboard face of the conveyor flight. In the preferred embodiment of the invention, the tapered tongue and groove connecting elements have a substantially dovetailed cross-sectional shape to prevent lateral or longitudinal separation of the flights from the drawbar hub. Pursuant to another feature of the invention, an adhesive material may be applied to the tapered tongue and groove connection to prevent loosening of the flights from the drawbar elements due to uneven intermittent loads caused by housing mis-alignment, dents, irregular surfaces or similar conveyor housing conditions or when the conveyor chain is disposed to move in a downward direction in an elevator type unit.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 2 is an enlarged, exploded perspective view of one of the drawbar elements and a pair of the conveyor flights showing the detail of the tapered self-tightening connections therebetween;

FIGS. 3–6 are further enlarged fragmentary views substantially as seen along lines 3—3, 4—4, 5—5 and 6—6, respectively, in FIG. 2;

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Figure 1:
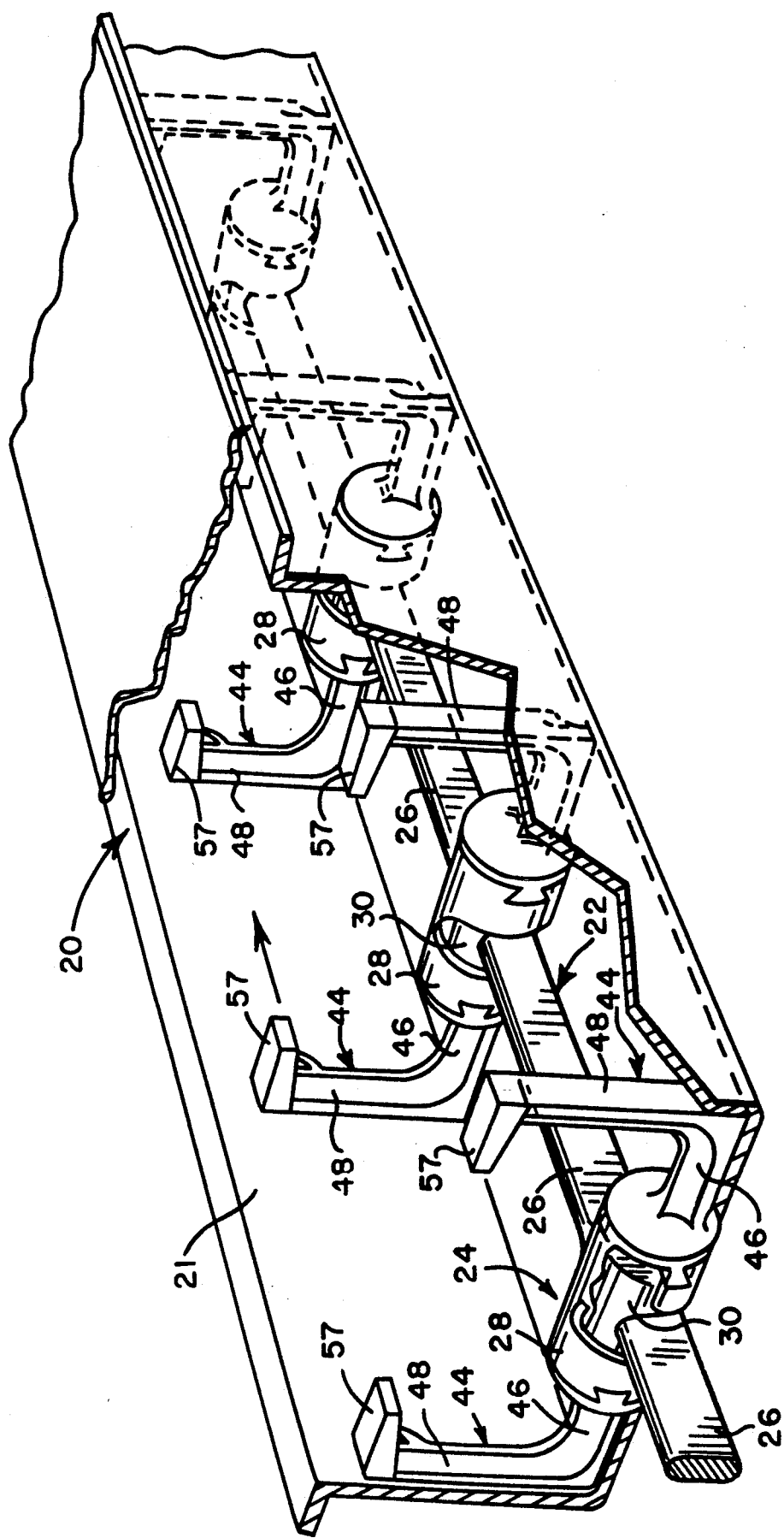
FIG. 1 is a perspective view, with certain portions broken away for clarity, of a conveyor incorporating the self-tightening connections of the present invention between the conveyor flights and the drawbar elements.

Turning now to the drawings, there is shown in FIG. 1 a conveyor 20 including an elongated housing 21, generally rectangular in cross-section, through which a conveyor chain 22 is pulled by a suitable drive sprocket (not shown). The conveyor 20 is particularly well suited for conveying flowable solid materials such as sand, grain, flour, dry chemicals or the like substantially as a placid column of material or en masse through the conveyor housing 21. It will be understood that the conveyor 20 may be disposed generally horizontally, at an incline, or substantially vertically. In the latter case, it may be referred to as an elevator but, for simplicity of discussion, it will be referred to herein as a conveyor. It will also be understood that the conveyor housing 21 is provided with suitable entrance and exit openings (not shown) for supplying bulk material to the conveyor at one location and discharging the material from the conveyor at another location.

The conveyor chain 22 is made up of a plurality of like, individually detachably and pivotally connected conveyor links 24. Each conveyor link 24 includes an elongated drawbar tension element 26 having a transversely extending hollow hub 28 at one end and a complementary shaped enlargement 30 at the other end.

As illustrated in the drawings, the hollow hub 28 has a generally circular inner wall 32 which opens downwardly through a transverse slot 34 having sufficient length and width for the enlargement 30 of a succeeding drawbar element 26 to pass through the slot 34 when the drawbar tension elements 26 are being coupled to and uncoupled from one anther. The enlargement 30 is preferably shaped substantially as illustrated in FIG. 2 with a generally semi-cylindrical outer bearing surface 36 adapted to cooperate with the cylindrical inner wall 32 of the hollow hub 28 when the drawbar elements 26 are disposed for normal operation within the conveyor housing 21 as shown in FIG. 1.

It will also be noted that the hub 28 is formed with a generally centrally located vertical slot 38 extending upwardly from the transverse slot 34 to adjacent the top of the hollow hub 28. The vertical slot 38 is dimensioned to receive the body of the drawbar element 26 and permit relative pivotal movement of adjacent drawbar elements as the conveyor chain traverses around the usual drive and idler sprockets of the conveyor 20. The transverse slot 34 is dimensioned to prevent the enlargement 30 from passing outwardly therethrough until the adjacent drawbar elements 26 are pivoted in the opposite direction a substantial amount so as to align the flat face 40 of the enlargement 30 with the forward wall 42 of the transverse slot 34 in the hollow hub 28. In this position, the adjacent drawbar elements 26 may be coupled and uncoupled with respect to one another.

In accordance with the present invention, each of the conveyor links 24 is provided with at least one transversely extending conveyor flight 44 for engaging and moving the flowable solid material substantially en masse through the conveyor housing 21. Pursuant to the invention each of the conveyor flights 44 is detachably connected to one of the drawbar tension elements 26 and the connection therebetween is formed so as to be self-tightening in normal use. As shown in FIGS. 1 and 2, a pair of generally L-shaped conveyor flights 44 are attached to each drawbar element 26 such that a lower leg 46 of the flight extends transversely outwardly from the hollow hub 28 and a vertical leg 48 extends upwardly generally perpendicular to the lower leg 46.

To detachably connect the flights 44 to the drawbar elements 26, interfitting means are formed on the outboard side faces 50 of the hollow hub 2 and the inboard faces 52 of the lower legs 46 of the flights 44. In the preferred embodiment, such interfitting means includes complementary tapered tongue and groove means formed on the inboard flight faces 52 and the outboard hub faces 50 so that the tapered tongue and groove components wedge more tightly together in normal use.

Referring more particularly to FIGS. 2–6, it will be seen that the outboard faces 50 of the hub 28 are formed with a tapered groove 54 which converges from front to back. The inboard faces 52 of the conveyor flight 44 are formed with complementary tapered tongues 56 which also taper from front to back and are dimensioned to be received in the tapered grooves 54 to provide a snug self-tightening connection. It should also be appreciated that while the grooves 54 are shown as formed on the faces 50 of the hub 28 and the tongues 56 are formed on the inboard faces 52 of the conveyor flights 44, the tongues and grooves could be formed on the opposite parts, if desired, without departing from the present invention.

Pursuant to another feature of the present invention, the tapered tongues 56 and grooves 54 are formed with a substantially dovetailed cross-sectional shape. This assures that the flights 44 will not become detached from the hubs 28 due to the exertion of transverse forces tending to pull the flights 44 laterally away from the drawbar elements 26.

In keeping with a further aspect of the invention, an adhesive material such as epoxy cement 55 may be applied to one or more of the mating surfaces of the tapered tongues 56 and grooves 54. As noted above, the tapered dovetail connections between the conveyor flights 44 and the drawbar hubs 28 are formed to be self-tightening in normal use. This configuration of the mating parts insures that the flights 44 do not become detached when the conveyor chain traverses a path that is generally horizontal, inclined upwardly or essentially vertically upward. However, when the conveyor 20 is used as an elevator, the downward return path of the conveyor chain 22 is disposed such that the forces of gravity and vibration could cause the flights to become loose and possibly fall away from the hubs 28. This potential problem is avoided, however, in the present invention by applying a bonding agent or adhesive material 55 to the tongue and groove connection between the conveyor flights 44 and the drawbar hubs 28.

Figure 7:
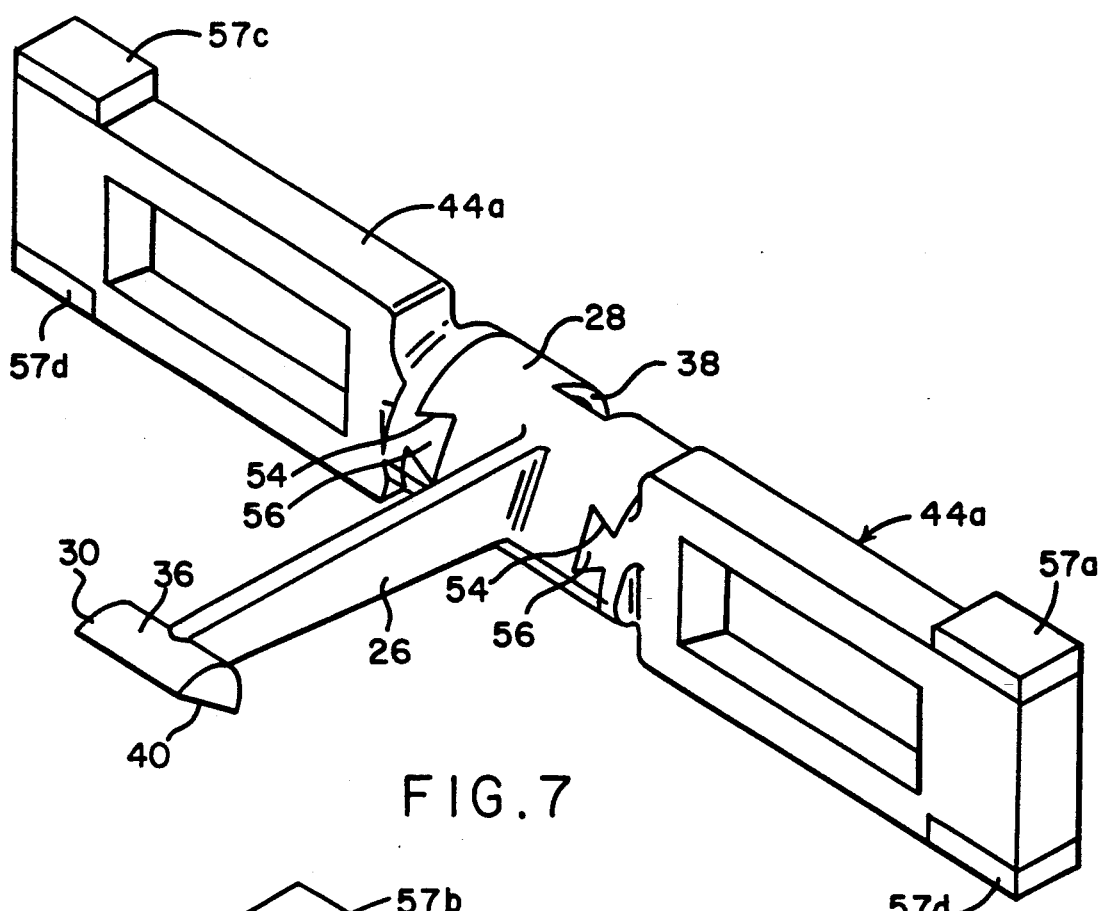
FIGS. 7 and 8 are perspective views illustrating alternate forms of conveyor flights.
Figure 8:
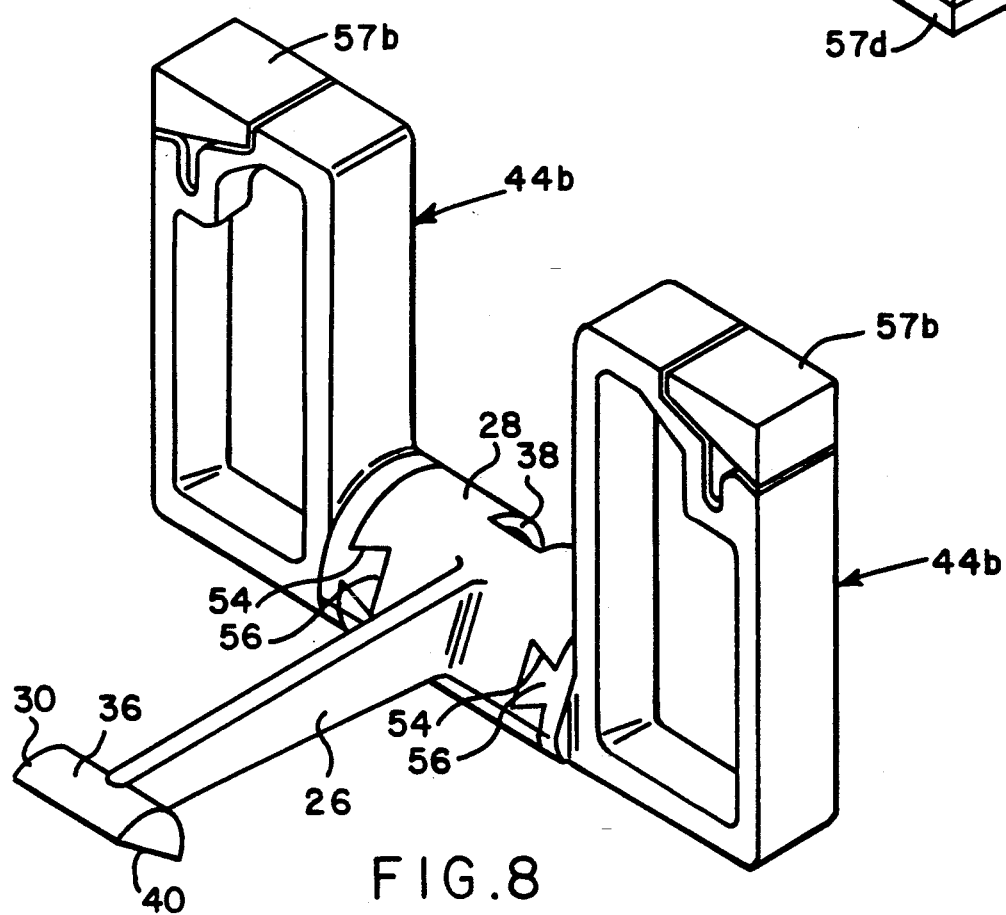

Turning now to FIGS. 7 and 8, it will be seen that the conveyor flights 44 may be formed with a variety of shapes in order to handle various kinds of flowable solid material having different characteristics. As shown in FIG. 7, the conveyor flights 44a are generally rectangular in shape and are attached to the hub 28 so as to extend outwardly substantially coaxially therefrom. In FIG. 8, the conveyor flights 44b are also generally rectangular in shape but are attached to the hub 28 so as to extend vertically and substantially perpendicular to the hub axis. It will be appreciated, of course, that in keeping with the present invention, the conveyor flights 44a and 44b shown in FIGS. 7 and 8 are formed with the same tapered, dovetail shaped tongues 56 as the flights 44 shown in FIGS. 1, 2, 5 and 6. Thus, the flights 44a and 44b can be used with the same drawbar elements 26 as shown in FIGS. 1–4. It will be understood, of course, that the conveyor housing 21 must have a cross-sectional shape compatible with the particular flights that are used. If desired, even a cylindrical or round, tubular shaped conveyor housing may be used, with correspondingly arcuate shaped flights, without departing from the invention.

In addition to permitting the use of conveyor flights 44 of differing shape with the same drawbar links 26, the present invention also permits forming the flights 44 from different material than the drawbar elements 26. Preferably, the drawbar elements 26 are cast of ductile iron in order to carry the loads imposed on the conveyor chain 22. On the other hand, the conveyor flights may be made of light-weight material such as aluminum or alloys thereof in order to reduce the total load imposed on the drawbar elements 26. Other materials such as bronze castings or malleable iron castings may also be utilized, if desired.

The present invention also contemplates that hardened, wear-resistant elements 57 may be secured to certain portions of the conveyor flights 44 in order to increase their useful life. As shown in FIGS. 1 and 2, wear-resistant elements 57 are secured to the ends of the upstanding vertical legs 48 of the L-shaped flights 44. When the conveyor 20 is formed with a return path superimposed on the housing 21, the wear-resistant elements 57 ride on the inside surface of the superimposed conveyor housing.

In FIG. 8, similar wear-resistant elements 57b are secured to the upper outer corners of the flights 44b. In some instances, it may be desirable to have wear-resistant elements 57c and 57d secured to both the top and bottom surfaces of the flights. The embodiment of flights 44a shown in FIG. 7 illustrates this alternative arrangement.

Figure 9:
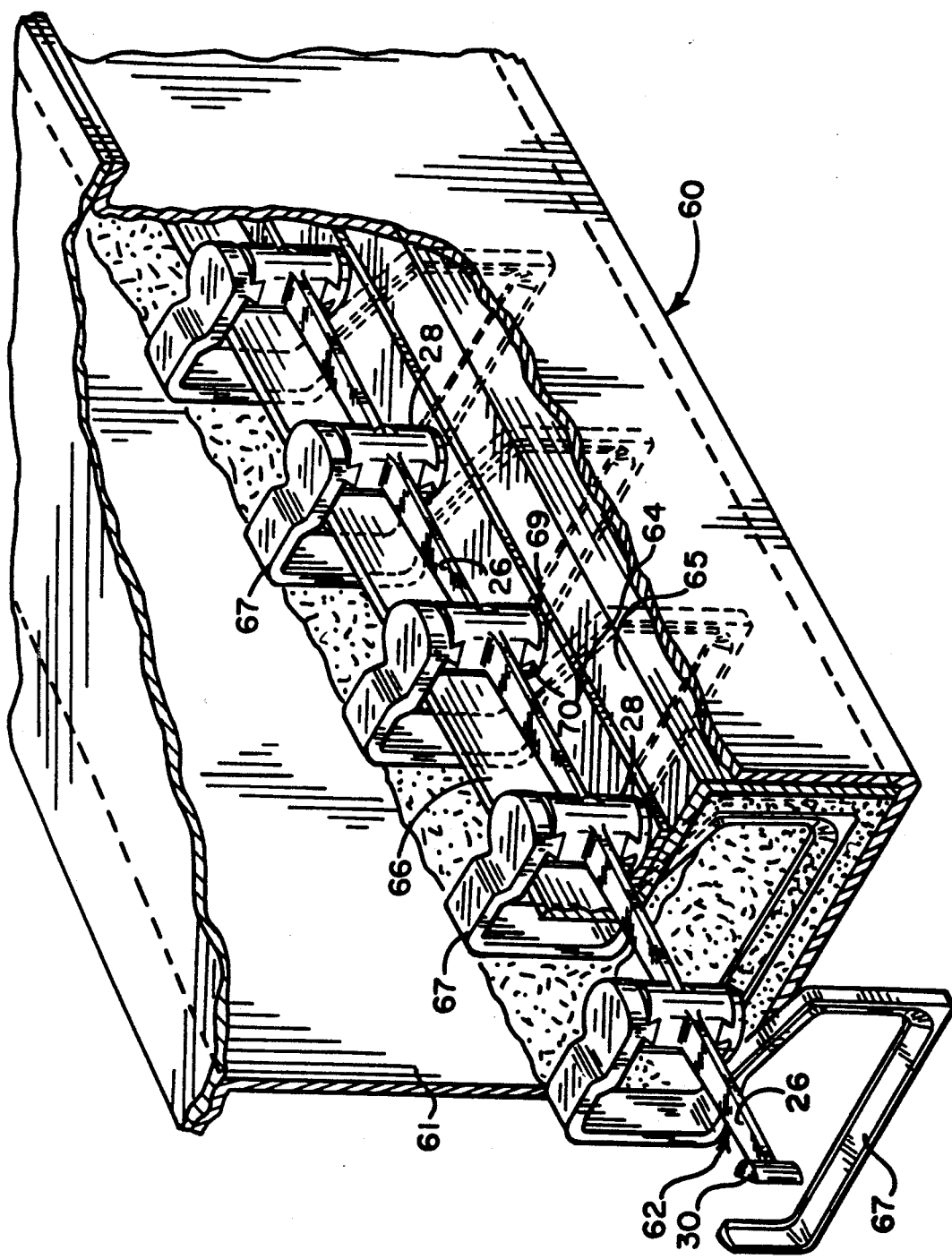
FIG. 9 is a perspective view, with certain portions broken away similar to FIG. 1, of an alternative embodiment wherein the conveyor is oriented as a side-pull conveyor.

The features of the self-tightening detachable connections between the conveyor flights and drawbar elements of the present invention may also be employed to advantage in a side-pull type conveyor. Such a conveyor arrangement 60 is shown in FIG. 9 and includes a conveyor housing 61 and a conveyor chain 62 comprised of a plurality of drawbar tension elements 26, which are the same as in the conveyor 20 in FIG. 1, but are turned 90° in a side-pull orientation. In this case, the housing 61 is also provided with an elongated channel or track 64 which supports the conveyor chain 62. Such a track 64 may be unitary or made of a pair of right-angled sheet metal parts 65 and 66 secured to the housing 61 by suitable means such as by bolts or spot welding.

As shown in FIG. 9, each of the drawbar elements 26 carries a conveyor flight 67 which has a generally Z-shaped configuration and extends transversely with respect to the conveyor chain 62. Pursuant to the present invention, each of the conveyor flights 67 is formed with a tapered, dovetail-shaped tongue 68 for detachable connection in the tapered groove 62 in the upper face of the drawbar hub 28. It will be appreciated that this tapered tongue and groove connection is similar to the detachable connection described for the embodiments shown in FIGS. 1-8 and is also self-tightening in normal use. An adhesive material may be applied to this tongue and groove connection to insure that the flights 67 do not become loose and fall free of the hubs 28 when the conveyor chain 21 is subject to vibration or uneven, intermittent loads.

Figure 10:
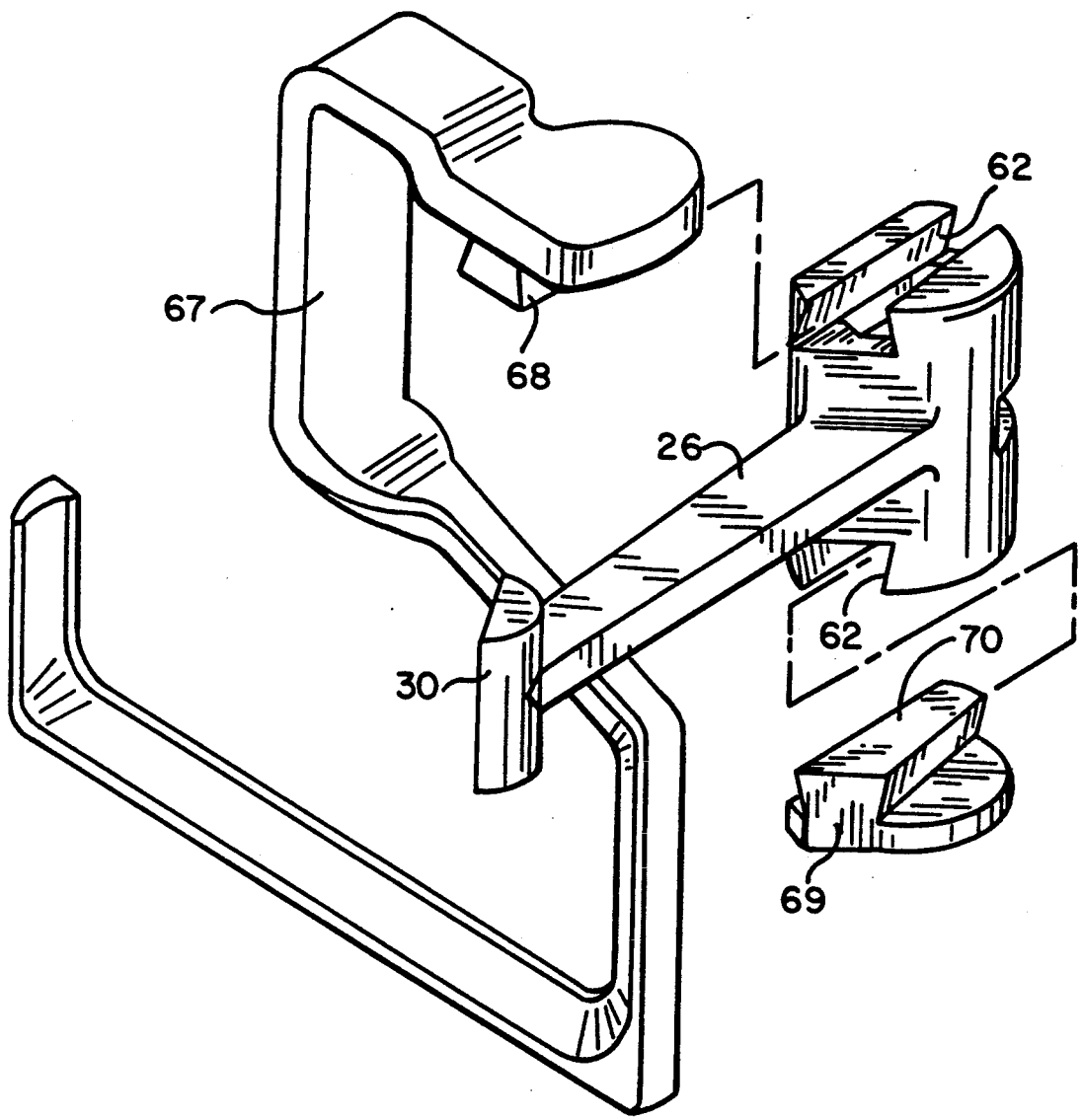
FIG. 10 is an enlarged, exploded perspective view of the drawbar element and conveyor flight for the side-pull conveyor of FIG. 9 and illustrating the self-tightening connection between the conveyor flight and drawbar.

It is a further feature of the invention as disclosed in the embodiment of FIGS. 9 and 10, that a readily replaceable wear element 69 may be detachably connected to the underside face of the drawbar hub 28. Thus, as shown in FIG. 10, the wear element 69 is also formed with a tapered, dovetail shaped tongue 70 that fits in the tapered groove 62 in the lower face of the hub 28. This tapered tongue and groove connection is also self-tightening in normal use but permits the wear elements 69 to be readily removed from the hub and replaced when they are worn.

From the foregoing, it will be appreciated that the present invention provides many advantages over the prior art integral drawbar and flight arrangements or conveyors where the flights are bolted or welded to the drawbars. For example, flights of different shapes or materials may be used with the same drawbar elements. The flights are readily detachable to facilitate replacement but by virtue of the tapered dovetail-shaped tongue and groove connections, are self-tightening in normal use. Hardened wear-resistant elements may be secured to selected wear points on the flights or may be attached directly to the underside of the hub of the drawbar when it is used in a side-pull conveyor orientation. Finally, it should be appreciated that the novel self-tightening, tongue and groove connections of the present invention can also be utilized to secure conveyor flights or other laterally projecting material engaging elements to the links of other styles of conveyor chains useful in conveying products other than flowable bulk materials in "en masse" conveyors.

I claim as my invention:

1. A conveyor link adapted to form part of a conveyor chain for conveying flowable solid material substantially en masse through an elongated conveyor housing, said conveyor link comprising in combination, an elongated drawbar tension element having a transversely extending hollow hub at one end and a complementary shaped enlargement at the other end adapted to be substantially wholly received in the hollow hub of an adjacent link to form part of said conveyor chain, said hub having a pair of side faces disposed laterally from said tension element and substantially opposite one another, a pair of transversely extending material conveying flights each having an outboard portion and an inboard face adapted to be attached to one of said hub side faces, and interfitting means formed on said inboard faces of said flights and said hub side faces for defining a detachable connection between each of said flights and said tension element, said interfitting means including complementary tapered tongue and groove means on each of said flight faces and said hub faces for making said detachable connection self-tightening in normal use.

2. A conveyor link as defined in claim 1 wherein said complementary tapered tongue and groove means have a substantially dovetailed cross-sectional shape.

3. A conveyor link as defined in claim 1 wherein said conveying flights are generally L-shaped in configuration and are adapted to be attached to said respective hub faces such that both legs of each of said L-shaped flights are disposed substantially perpendicular to said tension element.

4. A conveyor link as defined in claim 1 including a hardened wear element secured to said outboard portion of at least one of said flights.

5. A conveyor link as defined in claim 1 wherein said hub has an axis and said conveying flights are generally rectangular in shape with a frontal face and are adapted to be attached to said hub faces and extend substantially coaxially from said hub axis in opposite directions with said frontal face disposed substantially perpendicular to said tension element.

6. A conveyor link as defined in claim 5 including a hardened wear element secured to at least one side of each of said rectangular flights adjacent an outboard corner thereof.

7. A conveyor link as defined in claim 1 wherein said tension element and said conveying flights are made of metal, said tension element having higher tensile strength than said flights and said flights being made of lighter weight metal than said tension element.

8. A conveyor link as defined in claim 1 including adhesive means for bonding said interfitting means together.

9. A conveyor link as defined in claim 3 wherein said complementary tongue and groove means have a substantially dovetailed cross-sectional shape.

10. A conveyor link as defined in claim 5 wherein said complementary tongue and groove means have a substantially dovetailed cross-sectional shape.

11. A conveyor link adapted to form part of a conveyor chain for conveying flowable solid material substantially en masse through an elongated conveyor housing, said conveyor link comprising in combination, an elongated drawbar tension element having a transversely extending hollow hub at one end and a complementary shaped enlargement at the other end adapted to be substantially wholly received in the hollow hub of an adjacent link to form part of said conveyor chain, said hub having a pair of side faces adapted to be disposed vertically opposite one another with respect to said tension element, a transversely extending material conveying flight having an outboard portion and an inboard face adapted to be attached to one of said hub side faces, a wear element having an inboard face adapted to be attached to the other one of said hub faces, an interfitting means formed on said inboard faces of said flight and wear element and said hub side faces for defining a detachable connection between said flight and said tension element and between said wear element and said tension element, said interfitting means including complementary tapered tongue and groove means on said flight face, wear element face and hub faces for making said detachable connections self-tightening in normal use.

12. A conveyor link as defined in claim 11 wherein said complementary tongue and groove means have a substantially dovetailed cross-sectional shape.

13. A conveyor link as defined in claim 11 wherein said conveying flight is generally Z-shaped in configuration and one leg of said Z-shaped flight includes an inboard face adapted to be attached to said one hub face such that both legs of said Z-shaped flight are disposed substantially perpendicular to said tension element.

14. A conveyor link as defined in claim 11 including another wear element secured to said outboard portion of said conveying flight.

15. A conveyor link as defined in claim 11 wherein said tension element and said conveying flight are made of metal, said tension element having higher tensile strength than said flight and said flight being made of lighter weight metal than said tension element.

16. A conveyor link as defined in claim 11 including adhesive means for bonding said interfitting means together.

17. A conveyor link as defined in claim 13 wherein said complementary tongue and groove means have a substantially dovetailed cross-sectional shape.

18. A conveyor link as defined in claim 17 including another wear element secured to said outboard portion of said conveying flight.

* * * * *